(12) United States Patent
Glezer et al.

(10) Patent No.: US 10,272,436 B2
(45) Date of Patent: Apr. 30, 2019

(54) ASSAY CARTRIDGE VALVE SYSTEM

(71) Applicants: Eli N. Glezer, Del Mar, CA (US);
Bandele Jeffrey-Coker, Darnestown, MD (US); Kenneth Page, Germantown, MD (US); Sandor Kovacs, Middletown, DE (US); Sudeep Kumar, Gaithersburg, MD (US); Kristian Roth, Germantown, MD (US)

(72) Inventors: Eli N. Glezer, Del Mar, CA (US);
Bandele Jeffrey-Coker, Darnestown, MD (US); Kenneth Page, Germantown, MD (US); Sandor Kovacs, Middletown, DE (US); Sudeep Kumar, Gaithersburg, MD (US); Kristian Roth, Germantown, MD (US)

(73) Assignee: Meso Scale Technologies, LLC., Rockville, MD (US)

( * ) Notice: Subject to any disclaimer, the term of this patent is extended or adjusted under 35 U.S.C. 154(b) by 77 days.

(21) Appl. No.: 14/412,866

(22) PCT Filed: Jul. 3, 2013

(86) PCT No.: PCT/US2013/049296
§ 371 (c)(1),
(2) Date: Jan. 5, 2015

(87) PCT Pub. No.: WO2014/008381
PCT Pub. Date: Jan. 9, 2014

(65) Prior Publication Data
US 2015/0190810 A1 Jul. 9, 2015

Related U.S. Application Data

(60) Provisional application No. 61/668,226, filed on Jul. 5, 2012.

(51) Int. Cl.
*B01L 3/00* (2006.01)
*F16K 11/074* (2006.01)

(52) U.S. Cl.
CPC ............... *B01L 3/567* (2013.01); *B01L 3/502* (2013.01); *B01L 3/5085* (2013.01);
(Continued)

(58) Field of Classification Search
CPC .... B01L 3/567; B01L 3/502; B01L 3/502738; B01L 3/5085; B01L 2300/0681;
(Continued)

(56) References Cited

U.S. PATENT DOCUMENTS 5,819,798 A    10/1998 Claflin et al.
2007/0107499 A1    5/2007 Iwata
(Continued)

FOREIGN PATENT DOCUMENTS

WO    2012/042226 A2    5/2012

OTHER PUBLICATIONS

Extended European Search Report issued in connection with the corresponding European Patent Application No. 13813712.0 dated Feb. 8, 2016.
(Continued)

*Primary Examiner* — Robert J Eom
(74) *Attorney, Agent, or Firm* — The H. T. Than Law Group

(57) ABSTRACT

Assay cartridges are described that have a plurality of chambers and a fluidic network that includes fluidic conduits and a multi-port valve designed to selectively connect the valve inlet and one valve outlet through a fluidic connector in the valve as the remaining valve outlets are sealed.

38 Claims, 18 Drawing Sheets

(52) U.S. Cl.
CPC .... *B01L 3/502738* (2013.01); *F16K 11/0743* (2013.01); *B01L 2300/0681* (2013.01); *B01L 2300/0816* (2013.01); *B01L 2300/0867* (2013.01); *B01L 2300/0874* (2013.01); *B01L 2400/0487* (2013.01); *B01L 2400/0622* (2013.01); *B01L 2400/0644* (2013.01); *Y10T 436/2575* (2015.01)

(58) Field of Classification Search
CPC ..... B01L 2300/0816; B01L 2300/0867; B01L 2300/0874; B01L 2400/0487; B01L 2400/0622; B01L 2400/0644; F16K 11/0743; Y10T 436/2575
See application file for complete search history.

(56) References Cited

U.S. PATENT DOCUMENTS

| | | | |
|---|---|---|---|
| 2007/0144594 A1* | 6/2007 | Moon | F16K 11/074 137/625.46 |
| 2007/0194508 A1 | 8/2007 | Bucciero | |
| 2009/0007624 A1 | 1/2009 | Bade et al. | |
| 2011/0201099 A1 | 8/2011 | Anderson et al. | |
| 2011/0203678 A1 | 8/2011 | Servin | |
| 2013/0217106 A1 | 8/2013 | Jones | |

OTHER PUBLICATIONS

International Search Report and Written Opinion issued in connection with the corresponding International Application No. PCT/US2013/049296 dated Dec. 12, 2013.

* cited by examiner

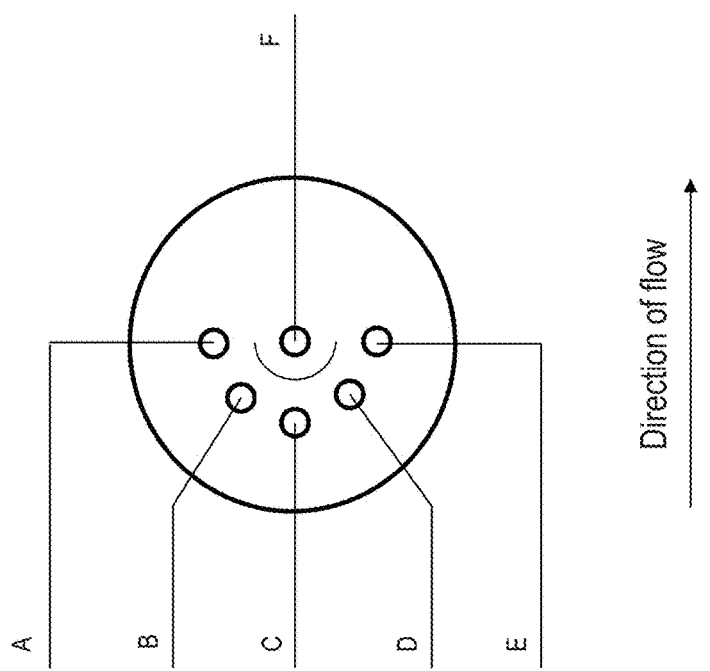

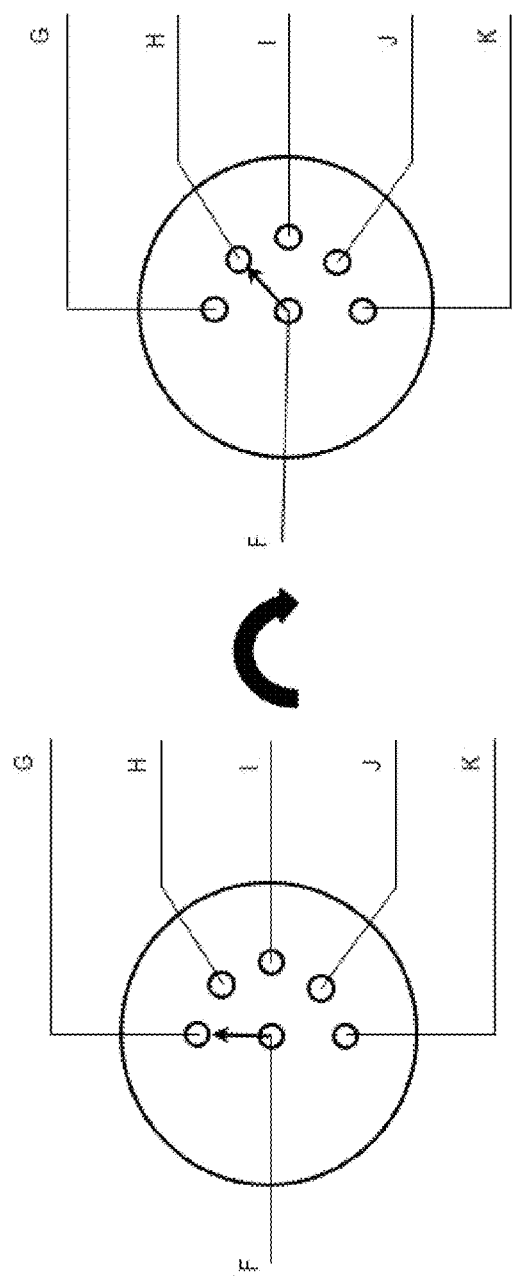

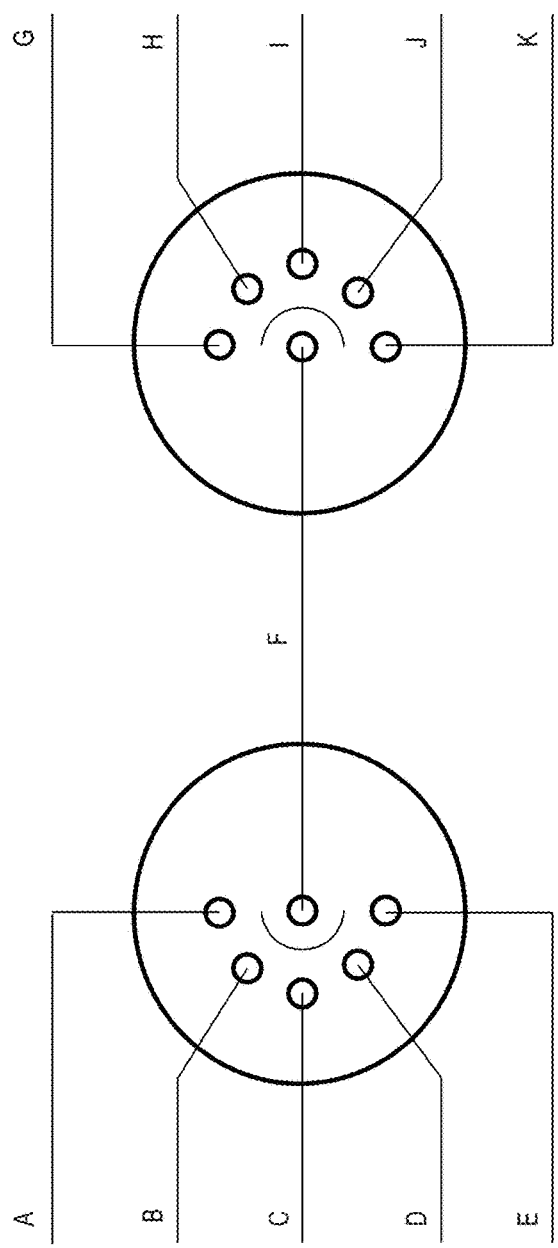

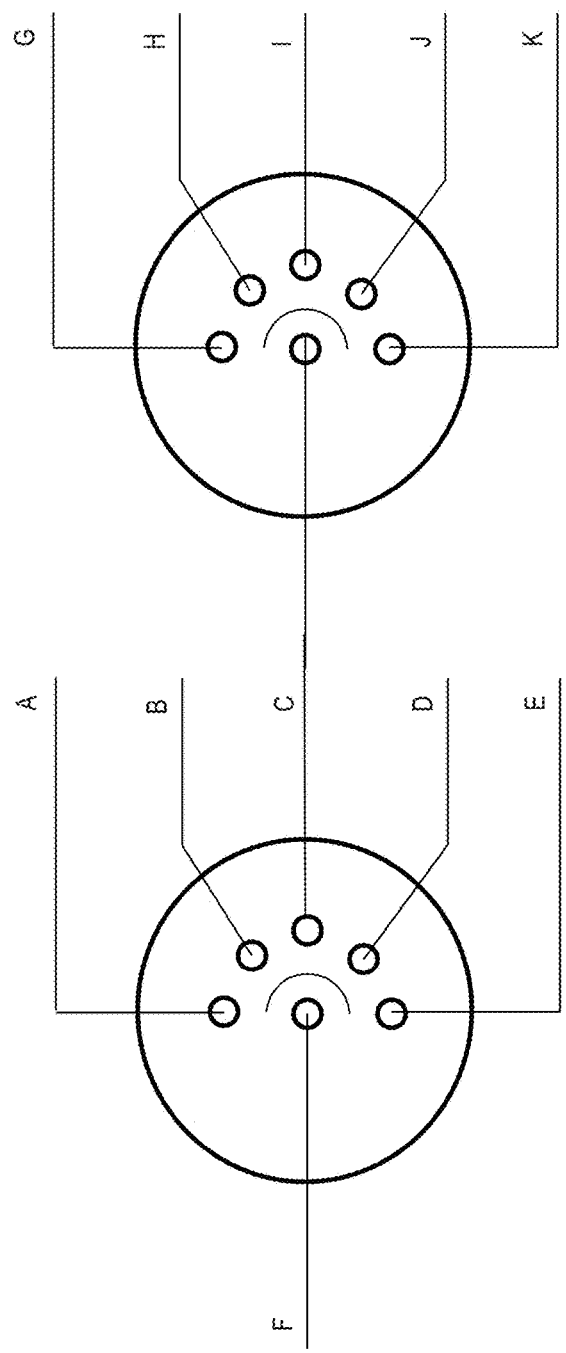

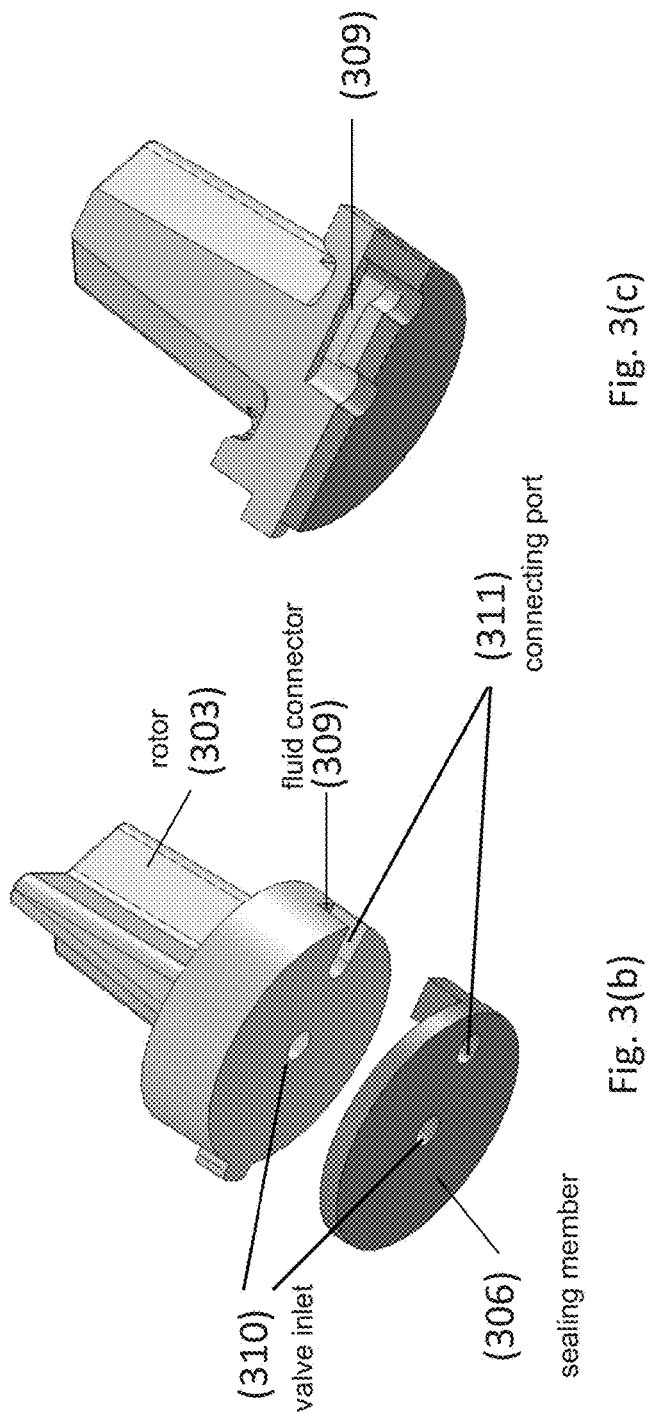

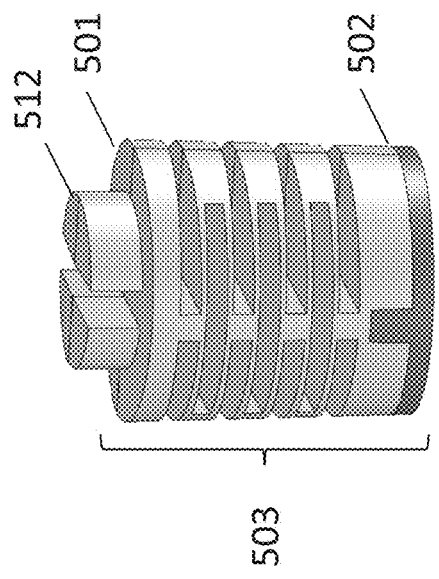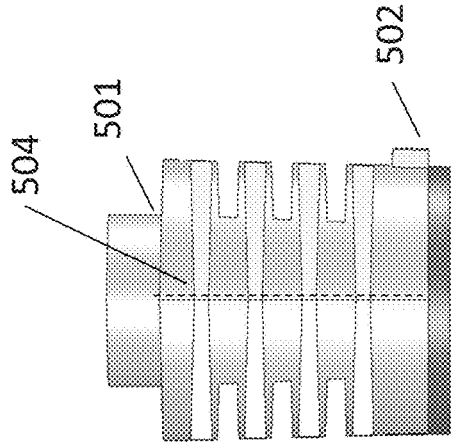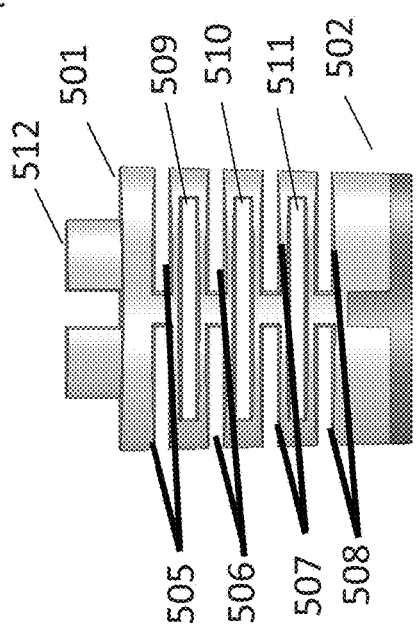
Fig. 5(b)
Fig. 5(d)
Fig. 5(c)

Figs. 5(e)-(i)
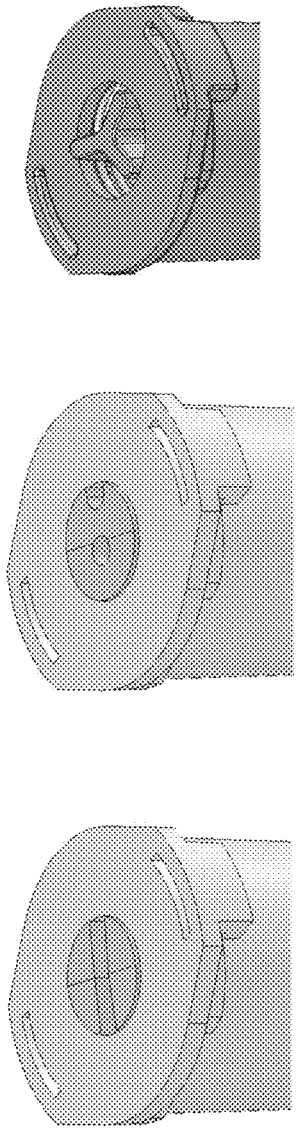
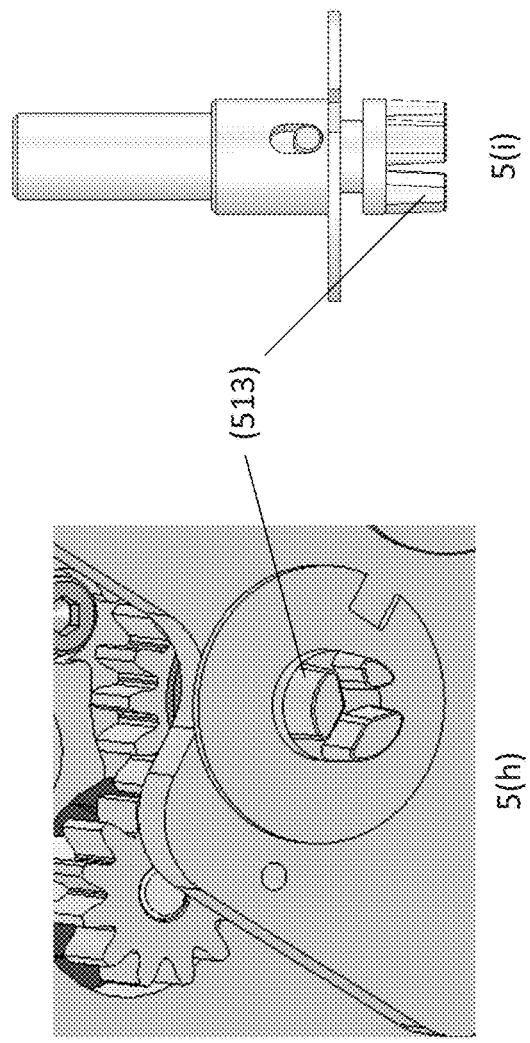

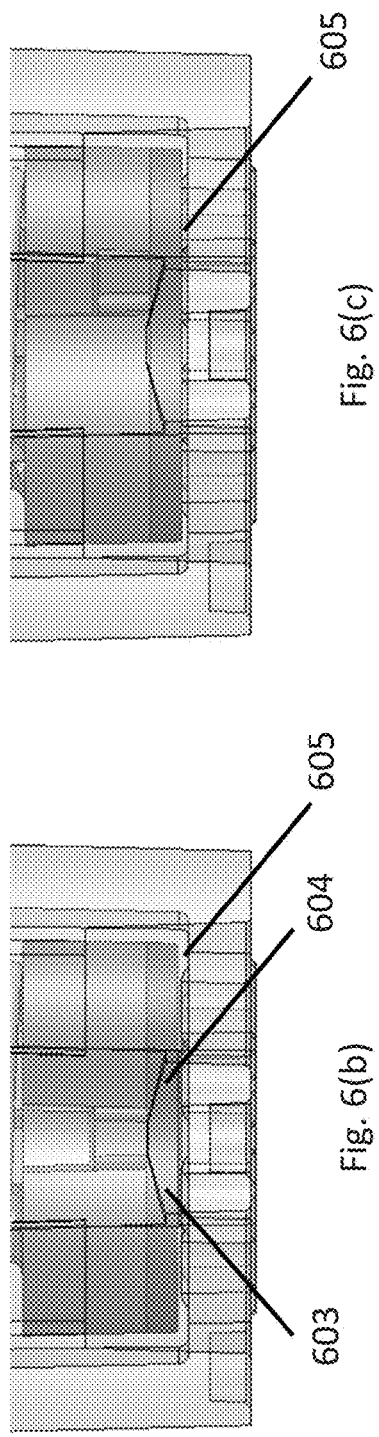

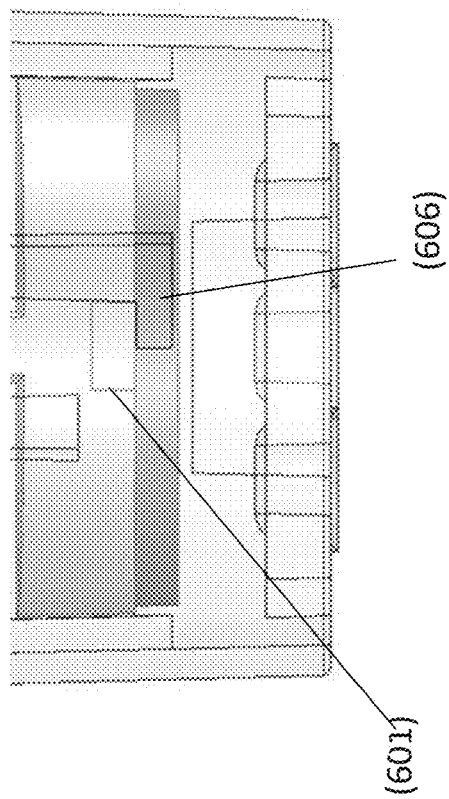
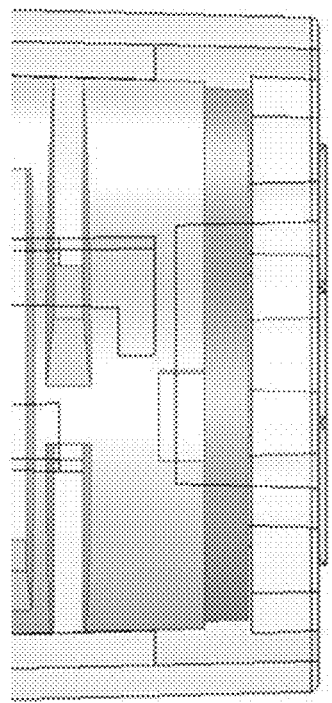
Fig. 6(f)
Fig. 6(g)

ASSAY CARTRIDGE VALVE SYSTEM

STATEMENT REGARDING FEDERALLY-SPONSORED RESEARCH

This invention was made with federal support under Contract No. W81XWH-10-20155 awarded under the U.S. Army Medical Research Acquisition Act. The U.S. government has certain rights in the invention.

CROSS-REFERENCE TO RELATED APPLICATION

Reference is made to copending application Ser. No. 13/343,834, filed Jan. 5, 2012 and Ser. No. 12/959,952, filed Dec. 3, 2010. The disclosures of each of these applications are incorporated herein by reference.

FIELD OF THE INVENTION

This application relates to apparatuses incorporating multi-port valves and methods of using such apparatuses for conducting chemical, biochemical and/or biological assays on a sample.

BACKGROUND OF THE INVENTION

Clinical measurements have been traditionally carried out in central clinical labs using large clinical analyzers that can handle large numbers of samples in batch mode. These laboratories are staffed by trained personnel that are capable of maintaining and running these complex analyzers. There is a growing desire to move clinical measurements from the central lab to the "point of care", e.g., the emergency room, hospital bedside, physicians office, home, etc. Point of care measurements allow a care provider or patient to quickly make decisions based on diagnostic information, as opposed to having to wait hours or days to receive laboratory results from a clinical lab. The difficulty in developing point of care diagnostic systems has been making them small enough and easy enough to use so that they can be used by unskilled operators in decentralized clinical settings, but at the same time maintaining the low cost, diverse assay menu, and/or high performance of tests carried out on traditional clinical analyzers in central laboratories.

In addition, certain types of tests carried out in point of care diagnostic systems involve a series of complex processes that can be hampered by the presence of contaminants in the system. For certain types of tests, e.g., polymerase chain reaction (PCR), the allowable levels of contamination are very low, typically one part in 10,000. There is a need for a point of care system that can conduct complex multi-step processes with minimal contamination from one step to the next.

SUMMARY OF THE INVENTION

The invention provides an assay cartridge comprising: (a) a plurality of chambers, and (b) a fluidic network including: (i) a plurality of fluidic conduits connecting the plurality of chambers; and (ii) a multi-port valve comprising:
(x) a cap;
(y) a stator comprising a rotor engagement member, a valve inlet, and a plurality of valve outlets accessible to one or more fluidic conduits in the fluidic network; and
(z) a rotor biased toward the stator and comprising a sealing member disposed between the rotor and the stator, a spring, and a stator engagement member configured to disengage the rotor when the stator engagement member is in communication with the rotor engagement member,
wherein, when engaged, the rotor is rotated to fluidically connect the valve inlet to one of the valve outlets through a fluidic connector on the rotor while the sealing member seals the remaining valve outlets.

In one embodiment the spring comprises a top surface, a bottom surface, a cylindrical body comprising a central vertical axis disposed between the top and bottom surfaces and a plurality of pairs of axially spaced radially extending grooves surrounding the central vertical axis, and a plurality of through-holes intersecting the central vertical axis at a position perpendicular to the intersection of the plurality of pairs of grooves to the central vertical axis. In this regarding, the plurality of pairs of grooves and the plurality of through-holes define a plurality of ribs in the cylindrical body. In a preferred embodiment, the spring is an integrated spring, e.g., a corrugated stem.

The multi-port valve of the assay cartridge of the invention can selectively open one of the plurality of valve outlets by (a) rotating the rotor via engagement between an instrument stepper motor (a drive element) and the instrument interface element, and (b) disengaging the stator and rotor engagement members, thereby fluidically connecting the valve inlet to one of the plurality of valve outlets through the fluidic connector and sealing the remaining valve outlets via compression of the sealing member against the stator.

The invention also includes a method of using a multi-port valve in an assay cartridge, wherein the cartridge comprises a plurality of chambers and a fluidic network including (i) a plurality of fluidic conduits connecting the plurality of chambers; and (ii) a multi-port valve comprising:
(x) a cap;
(y) a stator comprising a rotor engagement member, a valve inlet, and a plurality of valve outlets accessible to one or more fluidic conduits in the fluidic network; and
(z) a rotor biased toward the stator and comprising a sealing member disposed between the rotor and the stator, a spring, an instrument interface element, and a stator engagement member configured to disengage the rotor when the stator engagement member is in communication with the rotor engagement member,
the method comprising the steps of:
(a) contacting the instrument interface element with an instrument stepper motor;
(b) rotating the rotor to disengage the rotor and stator engagement members;
(c) connecting, fluidically, the valve inlet to one of the valve outlets through a fluidic connector on the rotor; and
(d) sealing the remaining valve outlets by contacting the sealing member to the stator.

Further provided is a method of moving fluid in an assay cartridge comprising a plurality of chambers and a fluidic network including a plurality of fluidic conduits connecting the plurality of chambers and a multi-port valve having:
(x) a cap;
(y) a stator comprising a rotor engagement member, a valve inlet, and a plurality of valve outlets accessible to one or more fluidic conduits in the fluidic network; and
(z) a rotor biased toward the stator and comprising a sealing member disposed between the rotor and the stator, a spring, an instrument interface element, and a stator engagement member configured to disengage the rotor when the stator engagement member is in communication with the rotor engagement member, the method comprising the steps of:

(a) introducing a fluid slug into the fluidic network;

(b) applying, selectively, pressure or vacuum at one or more fluidic junctions in the fluidic network to move the fluid slug through the fluidic network; and (c) directing movement of the fluid slug through the fluidic network by engaging the multi-port valve to fluidically connect the valve inlet to one of the valve outlets through a fluidic connector on the rotor while the sealing member seals the remaining valve outlets.

BRIEF DESCRIPTION OF THE DRAWINGS

FIGS. 2(a)-(i) show various embodiments of a multi-port valve. FIGS. 2(a)-(b) illustrate a multi-port valve that interfaces with a plurality of channels or conduits in a cartridge fluidic network to direct the flow of fluid from one of a plurality of channels to a single valve inlet (FIG. 2(a)) or from a single valve inlet to one of a plurality of outlets (FIG. 2(b)). FIGS. 2(c)-(d) show how fluid is directed in a multi-port valve from a valve inlet to one of a plurality of valve outlets and, upon rotation of the valve, to an adjacent outlet. Likewise, FIGS. 2(e)-(f) show how fluid can be directed in a multi-port valve from one valve outlet (G) to an adjacent valve outlet (H) and, upon rotation of the valve, from an adjacent valve outlet (H) to an additional valve outlet (I). FIGS. 2(g)-(i) show various alternative embodiments for the connection of multi-port valves in series.

FIGS. 3(a)-(c) illustrate the components of a multi-port valve, i.e., a cap, a spring, rotor, and stator and FIGS. 3(b)-(c) provide a detailed view of the fluidic channel between the rotor and the sealing member.

FIGS. 5(a)-(j) show the components of the valve and provide a detailed illustration of the design of the spring and the instrument interface element. FIG. 5(a) provides a detailed view of the retention cap, rotor, and stator, while FIGS. 5(b)-(d) show the instrument interface element and the spring from various vantage points. FIGS. 5(e)-(g) show various embodiments of the instrument interface element and FIGS. 5(h)-(j) illustrate the corresponding instrument engagement element and how the stepper motor (drive element) engages with the instrument interface element.

FIG. 6(a)-(g) show the storage elements of the rotor and stator, i.e., the stator engagement member and the rotor engagement member, respectively. FIGS. 6(b)-(e) illustrate how the rotor and stator engagement members communicate to engage/disengage the rotor from the stator and FIGS. 6(f)-(g) illustrate an alternate embodiment of the storage elements and communication between the stator and rotor engagement members.

DETAILED DESCRIPTION

The invention, as well as additional objects, features and advantages thereof, will be understood more fully from the following detailed description of certain preferred embodiments. Unless otherwise defined herein, scientific and technical terms used in connection with the present invention shall have the meanings that are commonly understood by those of ordinary skill in the art. Further, unless otherwise required by context, singular terms shall include pluralities and plural terms shall include the singular. The articles "a" and "an" are used herein to refer to one or to more than one (i.e., to at least one) of the grammatical object of the article. By way of example, "an element" means one element or more than one element.

The invention relates to a multi-port valve that can be used in an assay cartridge to facilitate fluid isolation in and selective fluidic communication throughout the cartridge fluidic network. An assay cartridge of the invention incorporates one or more fluidic components such as compartments, wells, chambers, fluidic conduits, fluid ports/vents, filters, valves, and the like and/or one or more detection components such as electrodes, electrode contacts, sensors (e.g., electrochemical sensors, fluid sensors, mass sensors, optical sensors, capacitive sensors, impedence sensors, optical waveguides, etc.), detection windows (e.g., windows configured to allow optical measurements on samples in the cartridge, such as absorbance, light scattering, refraction, or reflection, fluorescence, phosphorescence, chemiluminescence, electrochemiluminescence, etc.), and the like. A cartridge can also comprise reagents for carrying out an assay such as binding reagents, detectable labels, sample processing reagents, wash solutions, buffers, etc, and the reagents can be present in liquid form, solid form and/or immobilized on the surface of solid phase supports present in the cartridge. Certain preferred cartridge embodiments also comprise detection chambers having the electrode arrays and/or binding domains. The incorporation of the disclosed multi-port valve into an assay cartridge reduces the volume over which vacuum pressure builds in the fluidic network and potential contamination.

Figure 1:
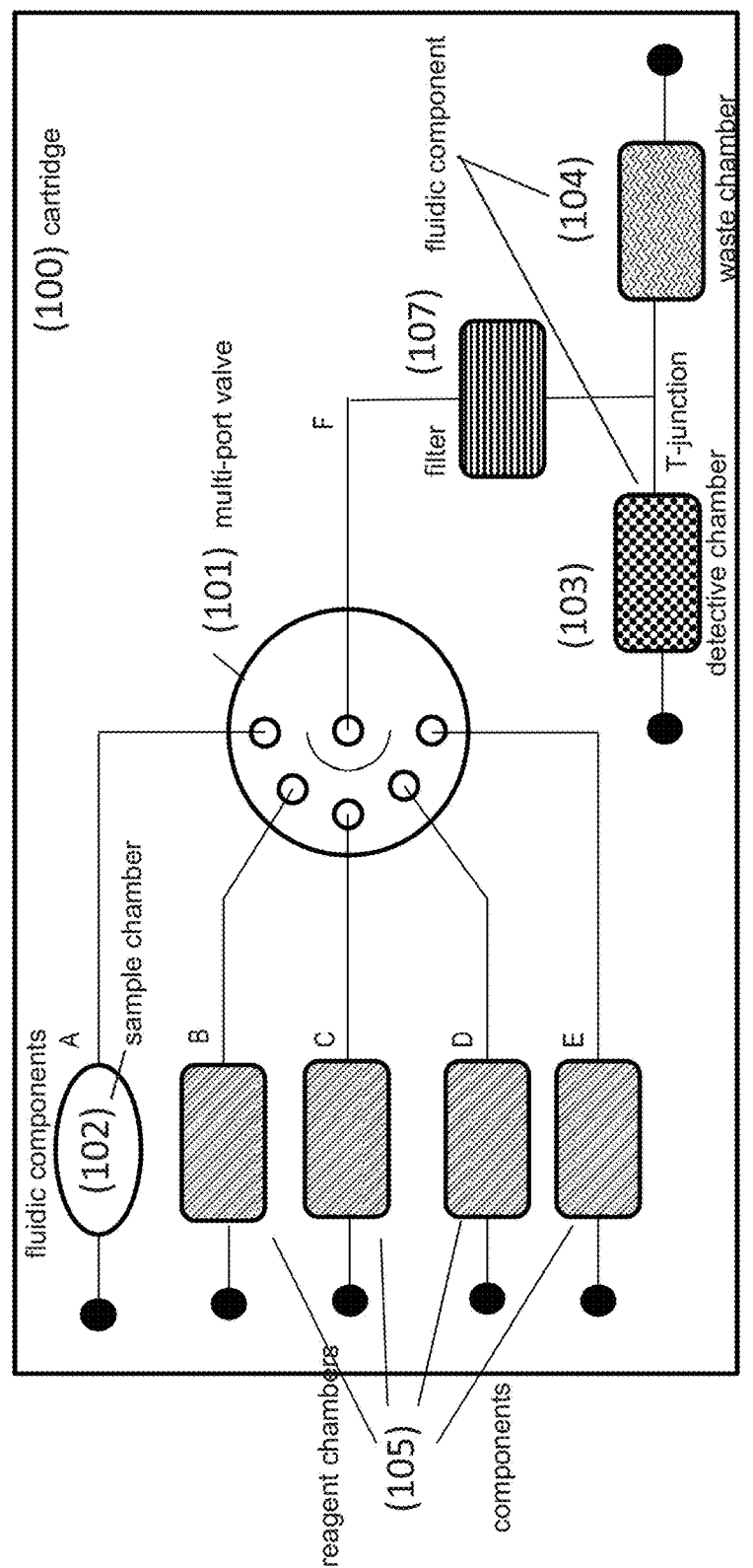
FIG. 1 depicts a simplified pictorial representation of a cartridge-based assay module incorporating a multi-port valve of the invention.
Figure 2B:
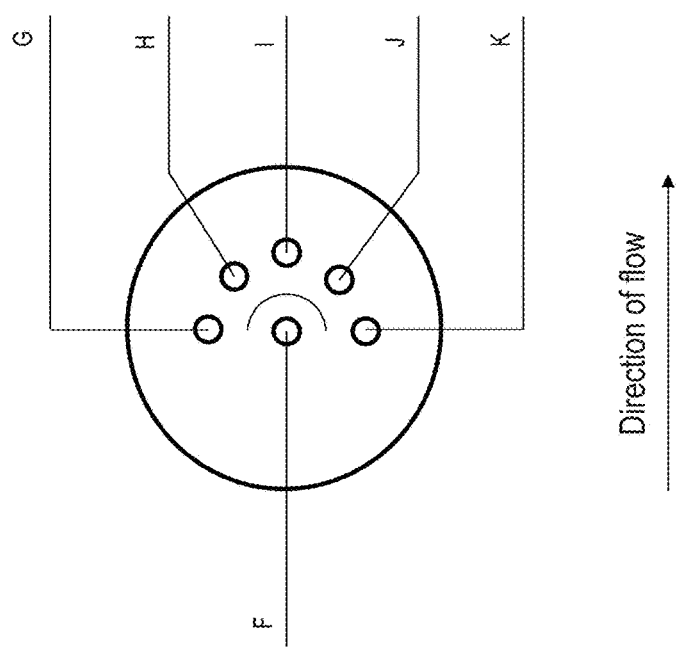
Figure 2F:
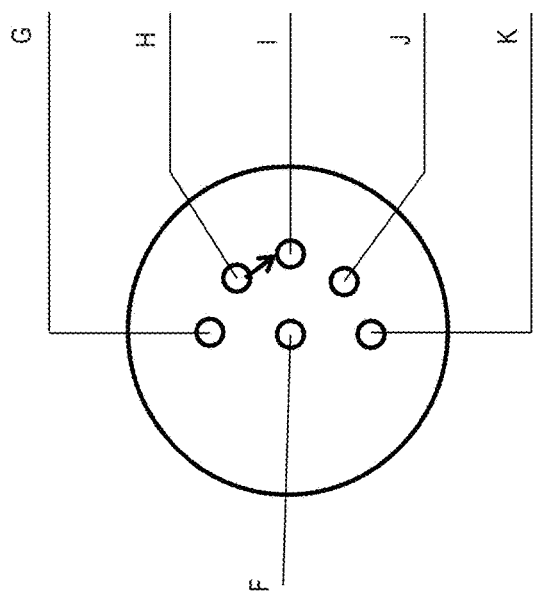
Figure 2E:
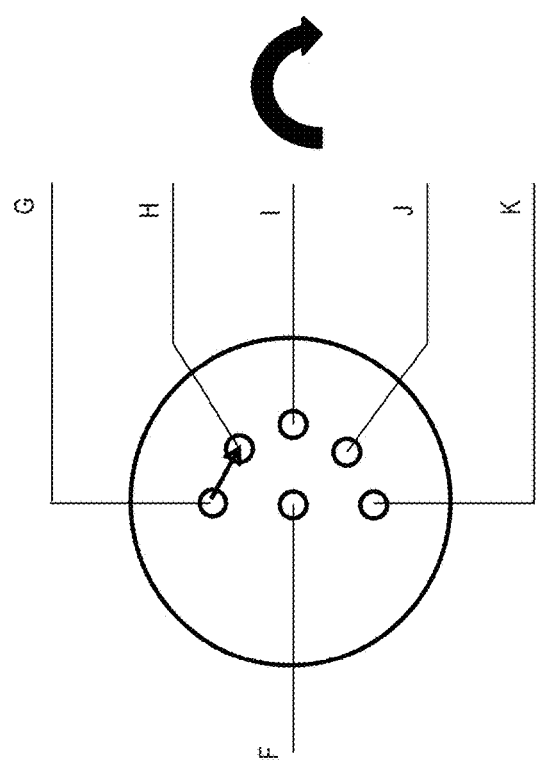
Figure 2I:
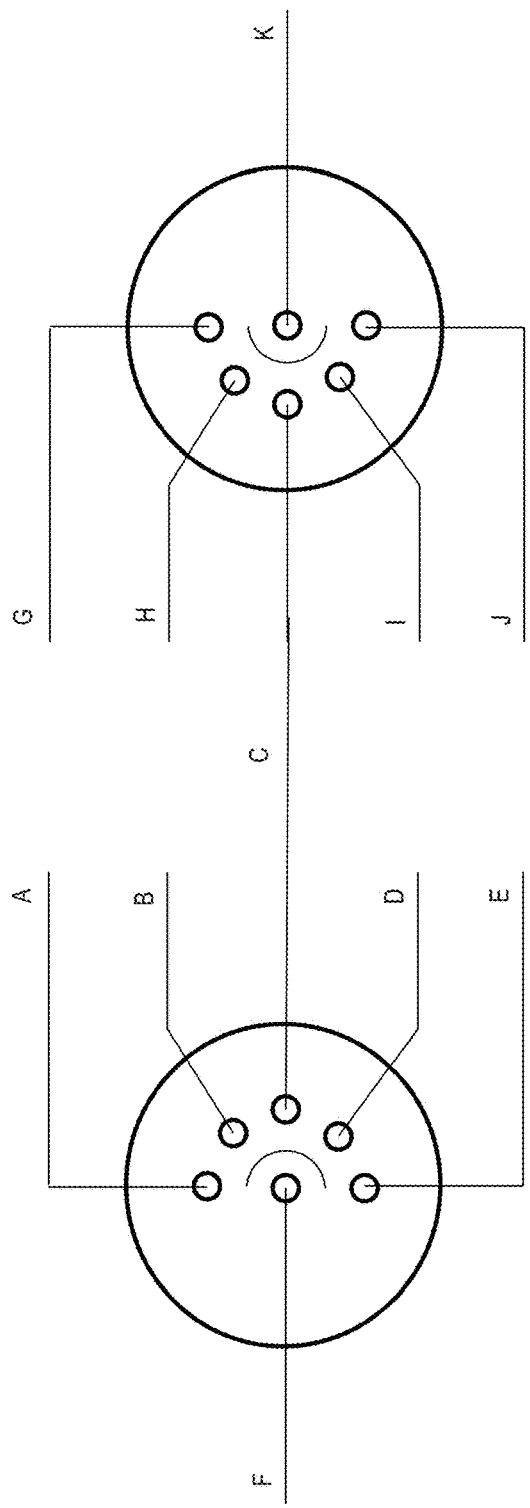

FIG. 1 depicts a simplified schematic of a cartridge-based biochemical detection system (100) that incorporates a multi-port valve (101). In the embodiment shown in FIG. 1, the cartridge includes one or more fluidic components (102, 105 and 107) that are linked to each other through a multi-port valve (101) and can also include fluidic conduits linking these components to additional components, as exemplified, by the connection of component (107) to additional fluidic components (103) and (104) (chambers (103) and (104) are connected via a T-junction in FIG. 1, but it is not necessary to connect these chambers in this fluidic configuration; in addition, the waste chamber (104) can be positioned on either side of the detection chamber (103)). Fluidic components that can be linked in this manner include sample introduction chambers, solid and liquid reagent storage chambers, reaction chambers, mixing chambers, filters, valves, and detection chambers and other fluidic components known in the art of fluidic assay devices. The cartridge can also include vent ports (106) in fluidic communication with the fluidic components (directly or through vent conduits) so as to allow the equilibration of fluid in the component with the atmosphere or to allow for the directed movement of fluid into or out of a specified chamber by the application of positive or negative pressure. The multi-port valve allows for the selective movement of fluid between the chambers linked to the valve and, in the case of cartridge (100), the selective movement of fluid from component (107) to component (102) or one of components (105) and/or the selective movement of fluid to component (107) from component (102) or one of components (105).

In one specific embodiment, the cartridge has sample chambers (102), one or more detection chambers (103) (preferably, detection chambers adapted for use in electrochemiluminescence measurements) and one or more waste chambers (104). The sample chamber is connected by a fluid conduit (A) directed through a multi-port valve (101) so that a sample introduced into a sample chamber can be delivered through a conduit (F) in the fluidic network into one or more detection chambers for analysis and then passed into one or more waste chambers for disposal (as shown in the embodiment in FIG. 1, a filter (107) is incorporated into the fluidic path downstream of conduit F). Preferably, this cartridge also includes one or more reagent chambers (105) for storing liquid reagents, the reagent chambers are connected via conduits (B-E) through the multi-port valve to the other components so as to allow the introduction of the liquid reagents into specified sample or detection chambers. The vent ports (106) are in fluidic communication with the sample, reagent, detection and/or waste chambers (directly or through vent conduits).

In a preferred embodiment of the invention, an assay cartridge has minimal or no active mechanical or electronic components. When carrying out an assay, such an assay cartridge may be introduced into a cartridge reader which provides these functions. For example, a reader may have electronic circuitry for applying electrical energy to the assay electrodes and for measuring the resulting potentials or currents at assay electrodes. The reader may have one or more light detectors for measuring luminescence generated at assay electrodes. Light detectors that may be used include, but are not limited to photomultiplier tubes, avalanche photodiodes, photodiodes, photodiode arrays, CCD chips, CMOS chips, film. The light detector may be comprised within an optical detection system that also comprise lenses, filters, shutters, apertures, fiber optics, light guides, etc. The reader may also have pumps, valves, heaters, sensors, etc. for providing fluids to the cartridge, verifying the presence of fluids and/or maintaining the fluids at an appropriate controlled temperature. The reader may be used to store and provide assay reagents, either onboard the reader itself or from separate assay reagent bottles or an assay reagent storage device. The reader may also have cartridge handling systems such as motion controllers for moving the cartridge in and out of the reader. The reader may have a microprocessor for controlling the mechanical and/or electronic subsystems, analyzing the acquired data and/or providing a graphical user interface (GUI). The cartridge reader may also comprise electrical, mechanical and/or optical connectors for connecting to the cartridge. The reader can also include motors and mechanical couplings to drive the movement of integrated valves in the cartridge.

An assay cartridge of the invention can be configured to conduct a multiplexed immunoassay and/or nucleic acid measurement on a biological fluid sample. With respect to assay cartridges configured to conduct multiplexed nucleic acid and immunoassay methods, reference is made to copending application Ser. No. 13/343,834, filed Jan. 5, 2012, and Ser. No. 12/959,952, filed Dec. 3, 2010, respectively, the disclosures of which are incorporated herein by reference in their entireties.

In a preferred embodiment, the assay cartridge includes a plurality of chambers and a fluidic network including a plurality of fluidic conduits connecting the plurality of chambers and a multi-port valve configured for fluid isolation and selective communication between fluidic conduits in the network. In certain embodiments, it is desirable to reduce or eliminate fluid contamination within the fluidic network of an assay cartridge, e.g., in those embodiments where contaminants can inhibit processes that occur downstream in the cartridge. For example, in an assay cartridge configured to analyze nucleic acid in a sample by a polymerase chain reaction (PCR), it is beneficial to avoid contamination of eluate after nucleic acid purification because contaminants can inhibit downstream processes like reverse transcription (RT) and PCR amplification. Such contaminants include but are not limited to lysis buffers like guanidine isothiocyanate (GuSCN), wash buffers, such as ethanol, hemoglobin from a blood sample, or humic acid from a soil sample. The placement of filters in the fluidic network to prevent contaminants from interfering with downstream processes can reduce contamination, but elevated pressures can develop in the fluidic network. In addition, vacuums can be generated downstream of the filters before liquid breaks through, with the trapped vacuum resulting in potential contamination of downstream processes.

This issue is addressed by the incorporation of a multi-port valve in the fluidic network of the cartridge, as shown in FIGS. 2(*a*)-(*b*), with the ability to selectively connect one or more conduits in a fluidic circuit, isolating the remaining conduits and mitigating developing vacuum pressure in the network as well as reducing potential contamination. A multi-port valve such as that described and claimed also minimizes carryover and contamination from processes conducted upstream of the valve in the fluidic network. Still further, the use of a multi-port valve reduces dead volume in the fluidic circuit to increase fluidic processing and it also maintains a seal under relatively high pressures. The dead volume is reduced in the valve by minimizing the distance and internal volume between the inlet and the outlets.

As shown in FIG. 2(*a*), the multi-port valve can be incorporated into a fluidic network to interface with a plurality of conduits (A-E) to isolate and direct fluid from one conduit of the plurality into a common channel or conduit (F). A valve of this configuration can be used to connect upstream cartridge components, e.g., reagent chambers, to a single downstream conduit. An alternate configuration is shown in FIG. 2(*b*), in which the valve directs fluid from a valve inlet (F) to one or more of a plurality of conduits (G-K). As shown in FIGS. 2(*c*)-(*d*), when the inlet (F) is connected to one of the outlets in the fluidic network, e.g., G, the remaining outlets are disconnected from the inlet, and when the valve is rotated to connect the inlet to another outlet in the network, e.g., H, the fluidic connection between F and G is disconnected and the remaining outlets remain disconnected from the inlet. A further embodiment is shown in FIG. 2(*e*), in which one of the plurality of conduits (G) in the fluidic network is connected to another of the plurality of conduits (H). When the valve is rotated, as in FIG. 2(*f*), the fluidic connection between conduits (G) and (H) is disconnected and a connection between conduits (H) and (I) is established.

One or more multi-port valves can be included in an assay cartridge. In one embodiment, up to 20 outlets can be included in an assay cartridge, preferably up to 10 outlets, and more preferably up to 6 outlets can be included in an assay cartridge. For those embodiments in which two or more valves are included in a cartridge, the valves can be connected in parallel or in series. Various alternative embodiments for the connection of two or more valves in series in a cartridge are illustrated in FIGS. 2(*g*)-(*i*). For example, the inlet of one valve can be connected to the common port of a proximate valve (FIG. 2(*g*)), one of the plurality of valve outlets of one valve can be connected to the inlet of a proximate valve (FIG. 2(*h*)), and/or one of the plurality of valve outlets of one valve can be connected to one of the plurality of outlets of a proximate valve (FIG. 2(i)).

Figure 3A:
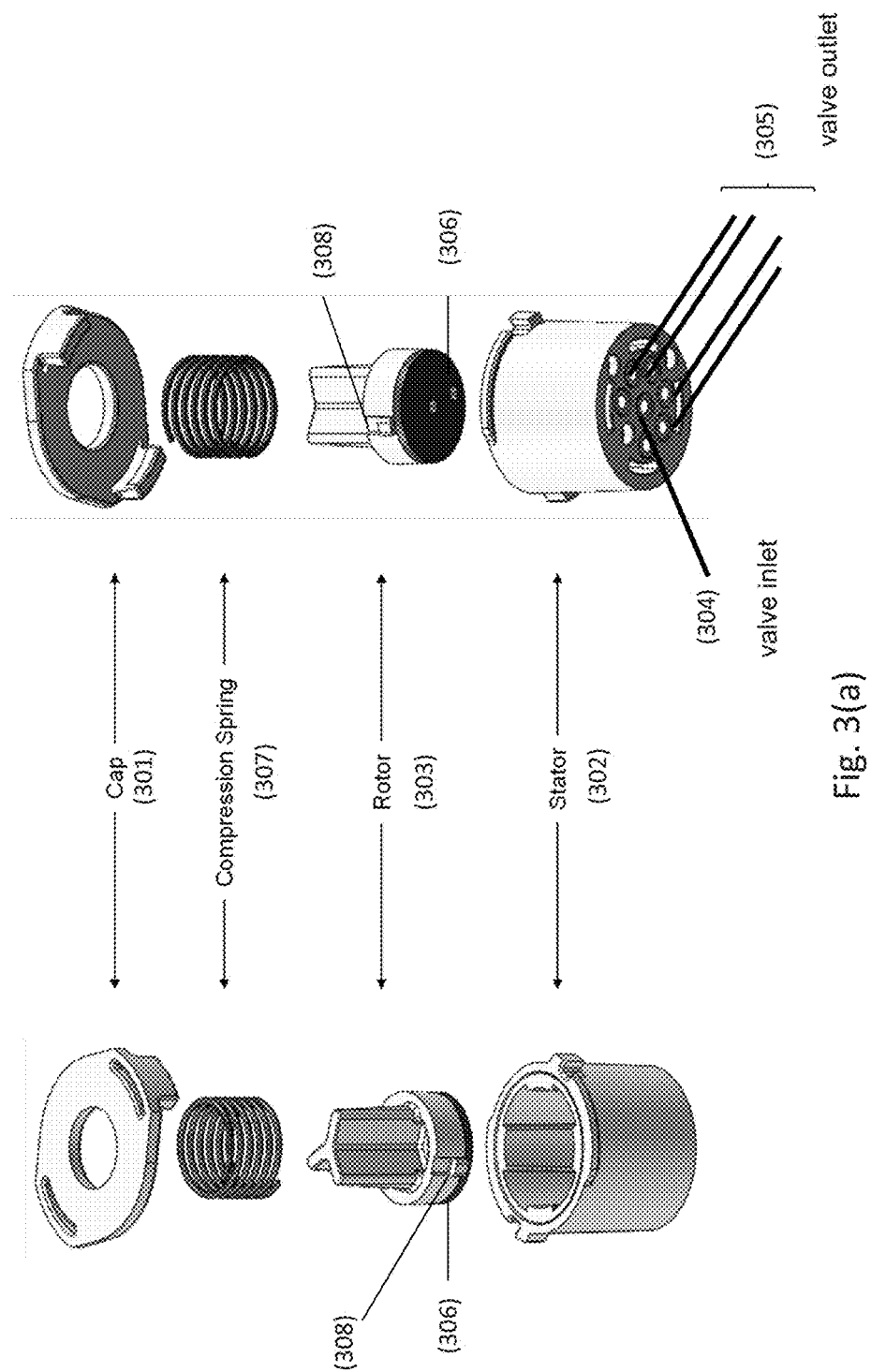

A more detailed view of the multi-port valve is shown in FIG. 3(a). The multi-port valve includes a cap (301), a stator (302), and a rotor (303). The stator comprises a rotor engagement member (not shown), a valve inlet (304), and a plurality of valve outlets accessible to one or more fluidic conduits in the fluidic network (305). The outlets are preferably positioned at a fixed radius from the valve inlet, preferably about 0.1 to about 0.4 inches (preferably the internal volume of the fluidic connector between the valve inlet and outlets is less than 10 uL and preferably less than 5 uL). The rotor is biased toward the stator and includes a sealing member (306) disposed between the rotor and the stator, a spring (307), and a stator engagement member (308) in communication with the rotor engagement member. When engaged, the rotor is rotated to fluidically connect the valve inlet to one of the valve outlets through a fluidic connector on the rotor while the sealing member seals the remaining valve outlets. A detailed view of the sealing member (306) is shown in FIGS. 3(b)-(c). FIG. 3(b) shows the sealing member separated from the rotor (303) to show the fluidic connector (309) on the rotor which comprises a channel between the valve inlet (310) and the connecting port (311). The sectioned view in FIG. 3(c) shows the fluidic connector (309) in more detail, illustrating how the channel is formed between the base of the rotor and the sealing member to connect the valve inlet to the connecting port.

Figure 4:
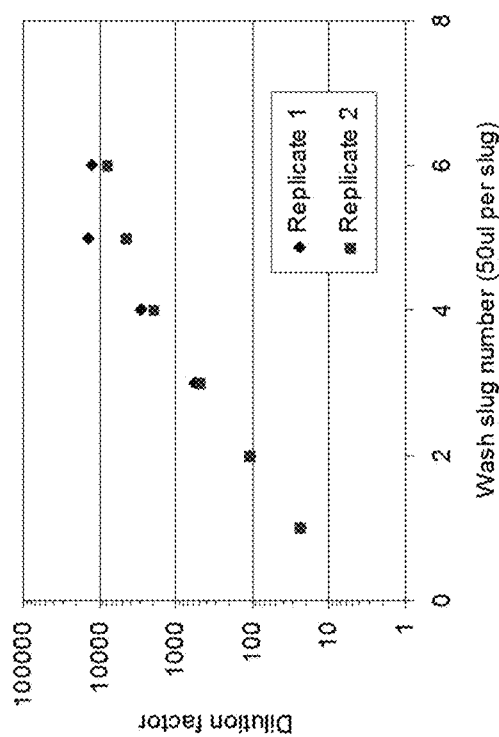
FIG. 4 shows the results of an experiment conducted to determine the amount of carryover in a multi-port valve. The amount of carryover was determined by flowing a buffer with free, unbound label through the valve and then measuring the amount of label in successive wash slugs. The graph shows that an approximate five-fold dilution factor is achievable with each round of washing (after the first cycle), and a wash quality of 10,000 is achievable with 5-6 washes.

The valve provides the ability to switch flow directions with accurate control and low dead volume (the internal dead volume is less than about 10 uL, preferably about 7 uL). Rotors, as described herein, with three different hardness/elasticity properties were tested (38A, 49A and 59A durometer on the Shore scale). The integrity of the seal was checked by sealing the valve outlets, pressurizing the valve inlet to about 10 psi, and measuring the pressure decay rate. The 59A elastomer created a good seal under spring forces greater than 1 lb. with air pressure decay rates of less than 0.1 psi / 30 seconds. Preferably, the sealing member has an elastomer with a Shore A hardness of between about 35 and 90, preferably with a Shore A hardness of at least about 40, preferably with a Shore A hardness of at least about 50, and more preferably with a Shore A hardness of at least about 60. The torque required to actuate the rotor with a sealing spring force of 1.5 lbs was measured to be less than 3 oz-in. The amount of liquid carryover in the valve was also measured and is shown in FIG. 4. A wash quality of about 1:10,000 with 5-6 washes (each wash was about 50 uL) was achieved using the multi-port valve of the present invention.

Figure 5A:
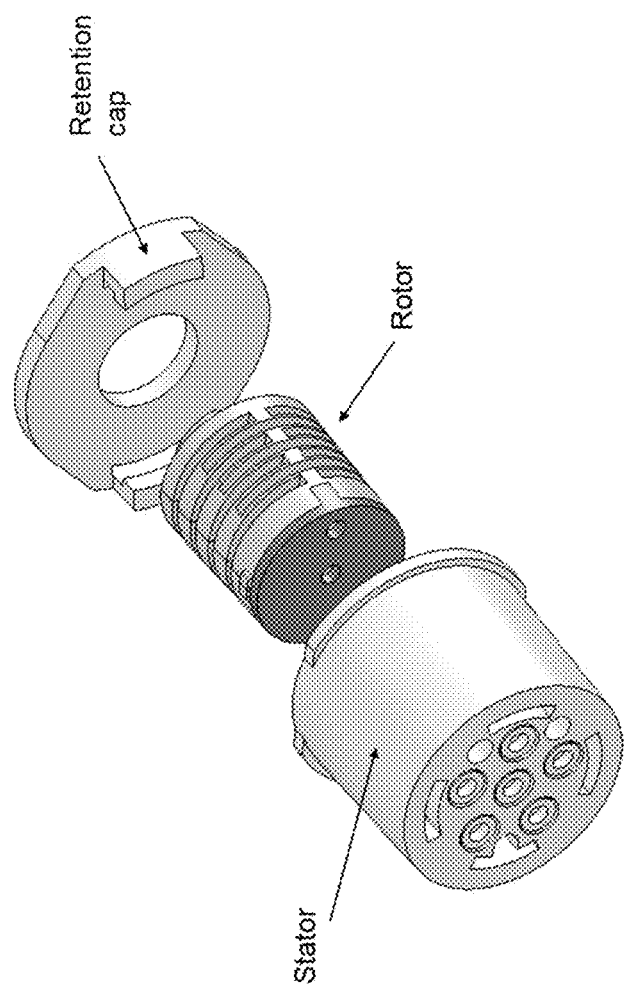

In one embodiment, the multi-port valve includes a spring (307) which is preferably disposed between the rotor and cap as shown in FIG. 3(a). FIG. 5(a) illustrates another embodiment where the spring is integrated into the structure of the rotor and an expanded view of one embodiment of the spring is shown in FIGS. 5(b)-(d). The spring (307) includes a top surface (501), a bottom surface (502), a cylindrical body (503) comprising a central vertical axis (504) disposed between the top and bottom surfaces and a plurality of pairs of axially spaced radially extending grooves (505-508) surrounding the central vertical axis, and a plurality of through-holes (509-511) intersecting the central vertical axis at a position substantially perpendicular to the intersection of the plurality of pairs of grooves to the central vertical axis. The unique configuration of paired grooves and through-holes define a plurality of ribs in the cylindrical body that provides a spring force to the spring, preferably between about 0.5-5.0 lbs, and more preferably about 2.5 lbs. The design illustrated in FIG. 5(a)-(d) enables manufacture of the spring via injection molding. In one embodiment, the spring is an integrated spring, e.g., a corrugated stem.

Figure 5I:
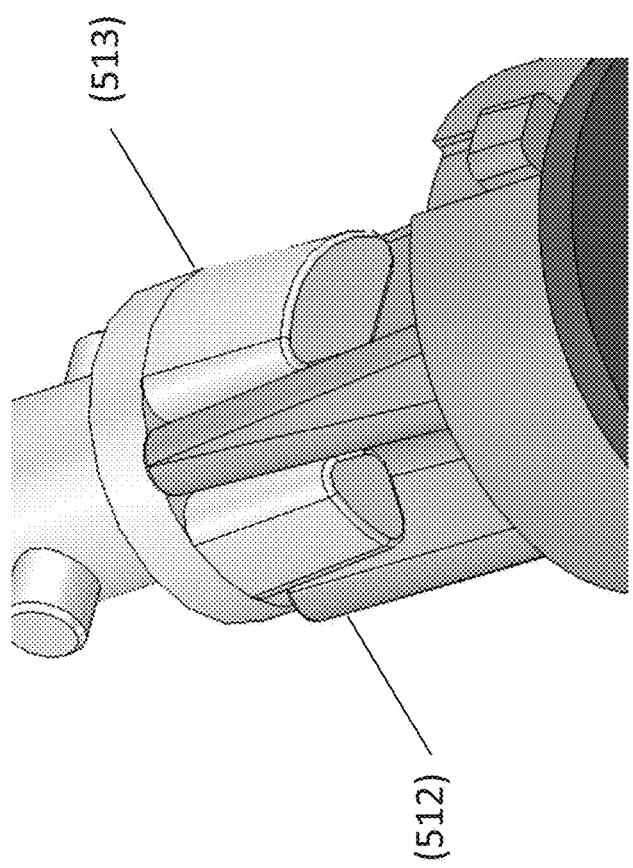

The rotor also includes an instrument interface element (512), e.g., on the top surface of the rotor configured to communicate with a drive element of a stepper motor in an instrument. When the instrument stepper motor and interface element are engaged, the stepper motor can index the rotor through the different fluidic ports on the stator. As illustrated in FIGS. 5(e)-(j), the rotor includes an instrument interface element on the top surface of the rotor that includes a slot configured to communicate with a stepper motor in an instrument and when engaged, the stepper motor can index the rotor through the different fluidic outlets on the stator. The instrument interface element can include one or more pin engagement holes or slots configured to communicate with one or more drive elements (e.g., pins) in the stepper motor. Alternatively, the instrument interface element includes a multi-blade engagement slot configured to communicate with a multi-lobe drive element in the stepper motor. Various embodiments of an instrument interface element are shown in FIGS. 5(e)-(g) and the engagement of the instrument interface element by an instrument stepper motor is illustrated in FIGS. 5(h)-(i). As shown in FIG. 5(e), in one embodiment, the instrument interface element comprises a slot, preferably a symmetric slot and the drive blade can be engaged 180° out of phase. Alternatively, as shown in FIG. 5(f), one or more pin engagement holes are used as an instrument interface element. The locations of the holes are not symmetric about the axis of the valve and therefore, there is only one orientation in which the pins can be engaged to insure proper clocking of the valve/driver interface. In another embodiment shown in FIG. 5(g), the instrument interface element comprises a three blade interface which provides a single orientation in which the stepper motor can be engaged. Preferably, the instrument interface element includes a three-blade engagement slot and the multi-lobe drive element comprises three lobes that can interface with the three-blade engagement slot. Most preferably, the lobes are non-rotationally symmetric, i.e., there is a single position per revolution in which the lobes and slots can engage. As illustrated in FIG. 5(h)-(j), the instrument drive interface (513) has a corresponding engagement element, i.e., an element configured to mate with the configuration of the instrument interface element of the valve (512). The instrument drive interface is preferably spring loaded. If the rotor and instrument drive interface are in phase, they will engage and if they are out of phase, then the over-travel spring will compress and prevent the instrument from locking so that the instrument drive interface can be rotated once more to engage and fully mate with the rotor.

Figure 6A:
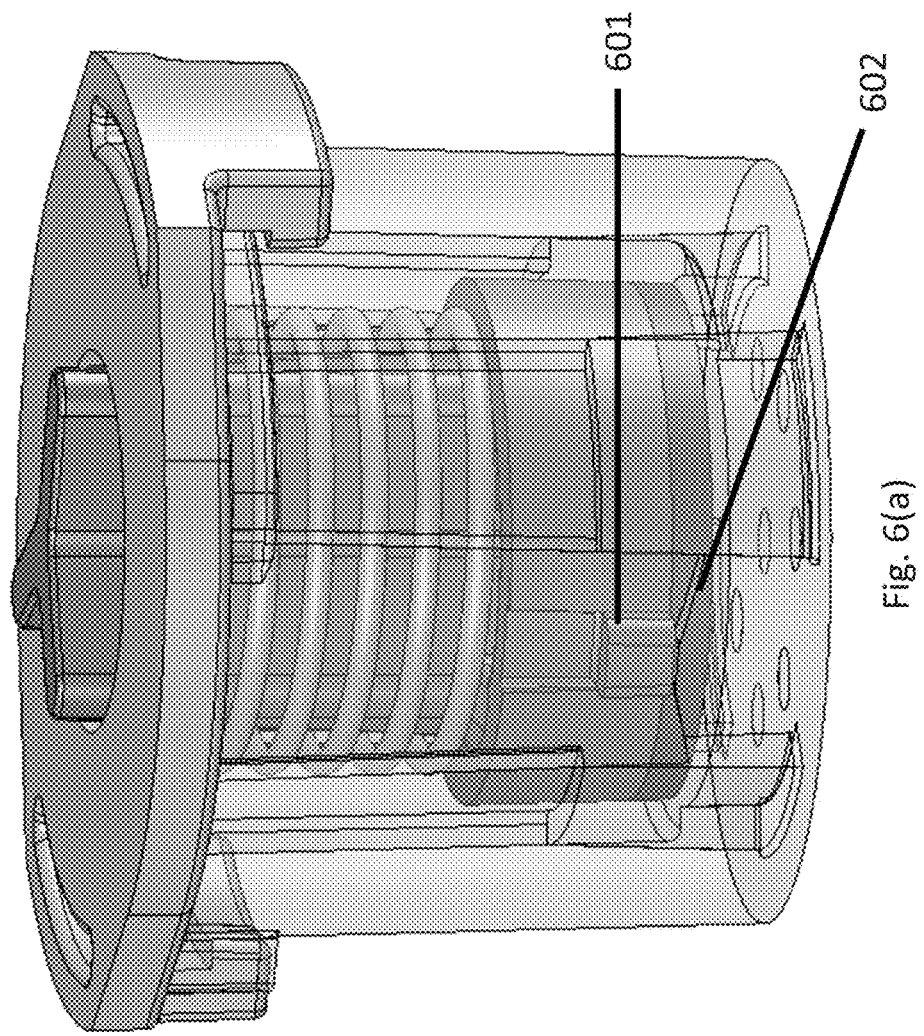

The multi-port valve includes rotor and stator engagement members that communicate to (a) raise the rotor off the stator during storage or other periods of non-use, preventing compression set during long term storage, and (b) lower the rotor to the appropriate position on the stator during use. The stator engagement member engages the rotor engagement member at a defined rotational position. A non-limiting example of the communication between the rotor and stator engagement members is illustrated in FIGS. 6(a)-(e). The stator and rotor engagement members (601 and 602), respectively the stator engagement member is also shown in FIG. 3 as element (308)) are configured to move the rotor away from and towards the stator to disengage and engage the stator and rotor, respectively. In the embodiment depicted in FIG. 6(a)-(e), the stator engagement element (601) comprises a tab and the rotor engagement element (602) comprises a ramp and the tab is designed to ride on the ramp to move the rotor away from or towards the stator. As shown in FIG. 6(*b*), the ramp includes a first slope (603) and a second slope (604) where one slope goes up and the other goes down. Preferably, a rest area having substantially no slope is disposed between the first and second slope tab (601) rides upward on one of the slopes to move the rotor away from the stator and the tab rides downward on the other slope to move the rotor toward the stator. When not in use, tab (601) may rest on the rest area between the first and second slope. FIGS. 6(*a*)-(*e*) illustrate one non-limiting embodiment of the communication between the rotor and stator engagement members. It will be understood by the skilled artisan that the shape of the stator engagement member and the relative upward and downward slope of the rotor engagement member can be adjusted without departing from the spirit or scope of the invention. In addition, alternative embodiments are also within the scope of the invention. For example, as shown in FIG. 6(*f*), the stator engagement member can comprise a tab and the rotor engagement member can comprise a ledge configured to receive and lock the tab in place, reversibly or irreversibly (in one embodiment, engagement of a tab and ledge can be reversed, e.g., by pulling on the rotor against the spring by an external means, e.g., via a bayonet style interlocking interface). FIG. 6(*g*) shows the tab and ledge disengaged.

The valve can selectively open one of the plurality of valve outlets by (a) rotating the spring via engagement between the instrument stepper motor and the instrument interface element on the top surface of the rotor, and (b) disengaging the stator and rotor engagement members, thereby fluidically connecting the valve inlet to one of the plurality of valve outlets through the fluidic connector and sealing the remaining valve outlets via compression of the sealing member against the stator. In one embodiment, the rotor is rotated to fluidically connect the valve inlet to two or more outlets while the remaining valve outlets are sealed by the sealing member. In a preferred embodiment, the multi-port valve includes one stator and corresponding rotor engagement member. Alternatively, the valve can include a plurality of stator and corresponding rotor engagement members, e.g., depending on the diameter of the valve and the relative need to evenly distribute the engagement member lifting forces to prevent the rotor from binding during disengagement.

In one embodiment, the multi-port valve selectively opens one of the plurality of valve outlets by (a) rotating the spring via engagement between an instrument stepper motor and the instrument interface element on the top surface of the rotor, and (b) disengaging the stator and rotor engagement members, thereby fluidically connecting the valve inlet to one of the plurality of valve outlets through a fluidic connector and sealing the remaining valve outlets via compression of the sealing member against the stator.

The transition of the rotor and stator engagement members from engaged (for storage) to disengaged (in which the sealing member makes full contact with the stator) is illustrated in FIGS. 6(*b*)-(*e*). In FIG. 6(*b*), the tab (601) and ramp (602) are fully engaged, producing a space (605) between the rotor and stator to fully disengage the seal from the stator. In FIG. 6(*c*), as the tab moves from the top of the ramp down the downward slope, the space (605) between the rotor and stator decreases. As shown in FIG. 6(*d*), as the tab moves further down the downward slope, the space (605) decreases still further until the tab/ramp reaches the fully disengaged position, at which point the seal is fully engaged with the stator (shown in FIG. 6(*e*)).

Therefore, a multi-port valve can be used in an assay cartridge by contacting the instrument interface element of the rotor with an instrument stepper motor, rotating the rotor to disengage the rotor and stator engagement members, fluidically connecting the valve inlet to one of the valve outlets through a fluidic connector on the rotor, and sealing the remaining valve outlets by contacting the sealing member to the stator. In a preferred embodiment, the stator includes one or more alignment guides that are used to align the stator within the instrument to insure appropriate alignment of the valve and stepper motor in the instrument. The rotating step commences by compressing the sealing member against the stator by disengaging the stator and rotor engagement members, as illustrated in FIGS. 6(*b*)-(*e*), while the fluidic connecting selection step includes rotating the rotor to the appropriate position so the valve inlet and valve outlets are aligned as necessary.

The invention further provides a method of moving fluid in an assay cartridge including a multi-port valve of the invention that comprises the steps of (a) introducing a fluid slug into a fluidic network in the cartridge, (b) selectively applying pressure at one or more fluidic junctions in the fluidic network to move the fluid slug through the fluidic network, and (c) directing movement of the fluid slug through the fluidic network by engaging the multi-port valve to fluidically connect the valve inlet to one of the valve outlets through a fluidic connector on the rotor while the sealing member seals the remaining valve outlets.

The positioning, configuration, geometry, and manufacture of fluidic conduits in the cartridge that interface with the multi-port valve described herein are described in paragraphs 228-286 and the accompanying figures of U.S. Application Publication No. 2011/0201099. Non-limiting examples of an immunoassay cartridge that can include the multi-port valve of the invention are described in paragraphs 180-286 and illustrated, inter alia, in FIGS. 9-22 of U.S. Application Publication No. 2011/0201099 (the identified disclosures of U.S. App. Pub. No. 2011/0201099 is incorporated herein by reference in its entirety). Likewise, non-limiting examples of a PCR cartridge that can include the multi-port valve of the invention are illustrated, inter alia, in FIGS. 1-4 and 6(*c*), and in the accompanying description on pages 10-50 and of U.S. application Ser. No. 13/343,834, filed Jan. 5, 2012 (the identified disclosure of U.S. Ser. No. 13/343,834 is incorporated herein by reference in its entirety).

The fluidic components are preferably designed and incorporated into the cartridge body to form the fluidic network using certain predefined design guidelines. The design guidelines for each component can be dependent upon one or more factors such as, e.g., cartridge body design (i.e., single-piece body, multiple piece body, modular body, single read chamber, multiple read chamber, and the like), manufacturing process (e.g., injection molding, blow molding, hot stamping, casting, machining, ultrasonic welding, laser welding, radio-frequency welding, etc.), materials (e.g., polycarbonate, acrylic, PVDF, PET, polystyrene, polypropylene, thermoplastic elastomer (TPE) and the like), assay requirements (e.g., binding assay, competitive binding assay, single step assay, two-step assay, etc.), functional requirements (e.g., sample size, assay reagent volumes, detection technology, time-to-result, incubation, heating, mixing/agitating), safety/handling requirements (e.g., self-containment, regulatory approval, ease of use, etc.), and/or the like.

In one preferred embodiment, the rotor is a unitary element including the spring and stator engagement member and the sealing member is attached to that unitary element. The rotor unitary element and/or the sealing member can be injection molded, with the sealing member over-molded to the bottom surface of the rotor unitary element. In an alternative embodiment, the rotor can be manufactured by laser welding or another similar process to define buried channels, with an over-molded sealing member on the bottom surface.

The skilled practitioner will be able to readily select materials suitable for the fabrication of the cartridges and multi-port valves of the invention. Suitable materials include glass, ceramics, metals and/or plastics such as acrylic polymers (such as Lucite), acetal resins (such as Delrin), polyvinylidene fluoride (PVDF), polyethylene terephthalate (PET), polytetrafluoroethylene (e.g., Teflon), polystyrene, polycarbonate, polypropylene, ABS, PEEK, thermoplastic elastomer (TPE) and the like. Preferably, the materials are inert to any solutions/reagents that will contact them during use or storage of the cartridge. In a preferred embodiment, the cartridge body comprises polycarbonate and the sealing member comprises thermoplastic elastomer.

The present invention is not to be limited in scope by the specific embodiments described herein. Indeed, various modifications of the invention in addition to those described herein will become apparent to those skilled in the art from the foregoing description and accompanying figures. Such modifications are intended to fall within the scope of the claims. Various publications are cited herein, the disclosures of which are incorporated by reference in their entireties.

What is claimed is:

1. An assay cartridge comprising:
   a) a plurality of chambers; and
   b) a fluidic network including
      i) a plurality of fluidic conduits connecting said plurality of chambers; and
      ii) a multi-port valve comprising:
         (y) a stator comprising a rotor engagement member and a first substantially planar surface comprising at least one valve inlet, and a plurality of valve outlets accessible to one or more fluidic conduits in said fluidic network; and
         (z) a rotor biased toward said stator by a spring and attached to a sealing member comprising a second substantially planar surface and disposed between said rotor and said stator and said rotor comprises a stator engagement member, wherein in a first configuration said rotor is moved away from said stator in a direction that compresses the spring when said stator engagement member is in communication with said rotor engagement member, wherein in a second configuration said stator, said sealing member and said rotor contact each other when said stator engagement member is not in communication with said rotor engagement member, wherein said rotor is configured to be rotated to fluidically connect said at least one valve inlet to one of said plurality of valve outlets through a fluidic connector on the rotor while said second planar surface of said sealing member seals against said first planar surface to seal the remaining valve outlets.

2. The assay cartridge of claim 1 wherein said spring is disposed between said rotor and a cap.

3. The assay cartridge of claim 1 wherein said spring comprises a top surface, a bottom surface, a cylindrical body comprising a central vertical axis disposed between said top and bottom surfaces and a plurality of pairs of axially spaced radially extending grooves surrounding said central vertical axis, and a plurality of through-holes intersecting said central vertical axis at a position perpendicular to the intersection of said plurality of pairs of grooves to said central vertical axis.

4. The assay cartridge of claim 3 wherein said plurality of pairs of grooves and said plurality of through-holes define a plurality of ribs in said cylindrical body.

5. The assay cartridge of claim 3 wherein said rotor is configured to be rotated by a stepper motor.

6. The assay cartridge of claim 3 wherein said top surface comprises an instrument interface element.

7. The assay cartridge of claim 6 wherein said bottom surface comprises said sealing member.

8. The assay cartridge of claim 7 wherein said multi-port valve is rotatable to selectively open one of said plurality of valve outlets.

9. The assay cartridge of claim 8 wherein said multi-port valve selectively opens one of said plurality of valve outlets by (a) rotating said rotor via engagement between a stepper motor and said instrument interface element, and (b) disengaging said stator and rotor engagement members, thereby fluidically connecting said valve inlet to one of said plurality of valve outlets through said fluidic connector and sealing the remaining valve outlets via compression of said sealing member against said stator.

10. The assay cartridge of claim 1 wherein said spring comprises a corrugated stem.

11. The assay cartridge of claim 1 wherein said spring has a spring force between about 0.5 and 5.0 lbs.

12. The assay cartridge of claim 1 wherein said spring has a spring force of about 2.5 lbs.

13. The assay cartridge of claim 1 wherein said rotor comprises an instrument interface element.

14. The assay cartridge of claim 13 wherein said instrument interface element comprises a slot configured to communicate with a stepper motor in said instrument.

15. The assay cartridge of claim 14 wherein said instrument interface element comprises one or more pin engagement slots configured to communicate with one or more drive pins in said stepper motor.

16. The assay cartridge of claim 14 wherein said instrument interface element comprises a multi-blade engagement slot configured to communicate with a multi-lobe drive element in said stepper motor.

17. The assay cartridge of claim 16 wherein said multi-blade engagement slot comprises a three-blade engagement slot and said multi-lobe drive element comprises three lobes.

18. The assay cartridge of claim 1 wherein said stator engagement member comprises a tab and said rotor engagement member comprises a ramp, wherein said tab rides on said ramp to move said rotor away from said stator.

19. The assay cartridge of claim 18 wherein said ramp comprises an upward slope and a downward slope.

20. The assay cartridge of claim 19 wherein said tab rides on said upward slope to move said rotor away from said stator and wherein said tab rides on said downward slope to move said rotor toward said stator.

21. The assay cartridge of claim 1 wherein said multi-port valve comprises up to 20 valve outlets.

22. The assay cartridge of claim 21 wherein said multi-port valve comprises up to 10 valve outlets.

23. The assay cartridge of claim 22 wherein said multi-port valve comprises up to 6 valve outlets.

24. The assay cartridge of claim 1 wherein said rotor is rotated to fluidically connect said valve inlet to two or more valve outlets through a fluidic connector on said rotor while said sealing member seals the remaining valve outlets.

25. The assay cartridge of claim 1 wherein said sealing member comprises an elastomer with a Shore A hardness of between about 35 and 90.

26. The assay cartridge of claim 1 wherein said sealing member comprises an elastomer with a Shore A hardness of at least about 40.

27. The assay cartridge of claim 1 wherein said sealing member comprises an elastomer with a Shore A hardness of at least about 50.

28. The assay cartridge of claim 1 wherein said sealing member comprises an elastomer with a Shore A hardness of at least about 60.

29. The assay cartridge of claim 1 wherein said plurality of valve outlets are positioned in said stator at a fixed radius from said valve inlet.

30. The assay cartridge of claim 29 wherein said fixed radius is between about 0.1 and about 0.4 inches.

31. The assay cartridge of claim 1 wherein said multi-port valve comprises an internal dead volume of less than about 10 uL.

32. The assay cartridge of claim 1 wherein said multi-port valve comprises an internal dead volume of about 7 uL.

33. The assay cartridge of claim 1 wherein said rotor is a unitary element including said spring and said stator engagement member, and said sealing member is attached to said unitary element.

34. The assay cartridge of claim 33 wherein said unitary element and/or said sealing member is/are injection molded.

35. The assay cartridge of claim 1 wherein said plurality of chambers comprises a sample chamber, a detection chamber, and a waste chamber.

36. The assay cartridge of claim 35 wherein said sample chamber is connected to a sample chamber conduit comprising a filter outlet conduit connected to said valve inlet.

37. The assay cartridge of claim 1 wherein said cartridge comprises two or more of said multi-port valves.

38. The assay cartridge of claim 37 wherein said two or more of said multi-port valves are connected in series.

* * * * *